(12) United States Patent
Temple

(10) Patent No.: US 11,844,974 B2
(45) Date of Patent: Dec. 19, 2023

(54) FREE-STANDING PORTABLE FIREFIGHTING TRAINING APPARATUS

(71) Applicant: Firevent, LLC, Carson City, NV (US)

(72) Inventor: Rodney Gene Temple, Carson City, NV (US)

(*) Notice: Subject to any disclaimer, the term of this patent is extended or adjusted under 35 U.S.C. 154(b) by 336 days.

(21) Appl. No.: 17/396,353

(22) Filed: Aug. 6, 2021

(65) Prior Publication Data
US 2023/0043754 A1    Feb. 9, 2023

(51) Int. Cl.
*A62C 99/00* (2010.01)
*G09B 9/00* (2006.01)

(52) U.S. Cl.
CPC ............ *A62C 99/0081* (2013.01); *G09B 9/00* (2013.01)

(58) Field of Classification Search
CPC .............................. G09B 9/00; A62C 99/0081
See application file for complete search history.

(56) References Cited

U.S. PATENT DOCUMENTS

| | | | | |
|---|---|---|---|---|
| 5,152,109 A | * | 10/1992 | Boers | E04H 3/24 296/26.02 |
| 8,360,782 B1 | * | 1/2013 | Temple | G09B 19/00 434/226 |
| 8,435,039 B2 | * | 5/2013 | Paganini | G09B 19/24 434/226 |
| 2017/0011660 A1 | * | 1/2017 | Pierce | B60P 3/14 |
| 2021/0113874 A1 | * | 4/2021 | King | G09B 19/003 |

* cited by examiner

*Primary Examiner* — Jay Trent Liddle
*Assistant Examiner* — Alyssa N Brandley
(74) *Attorney, Agent, or Firm* — Kenneth D'Alessandro

(57) ABSTRACT

A simulated roof firefighting training apparatus includes a rectangular frame having first and second side members and bottom and top members attached to the first and second side members to form a roof area, each of the bottom and top members including spaced apart rafter supports on inner faces thereof, first and second lifting arms having first ends pivotally mounted to the first and second side members, first and second vertical supports attached, respectively, to the first and second side members at positions proximate to the bottom member of the frame, raising mechanisms pivotally mounted between the side members and the first and second lifting arms, respectively, and fixed vertical supports attached to side members or the top member at a position proximate to where the side members are attached to the top members.

20 Claims, 7 Drawing Sheets

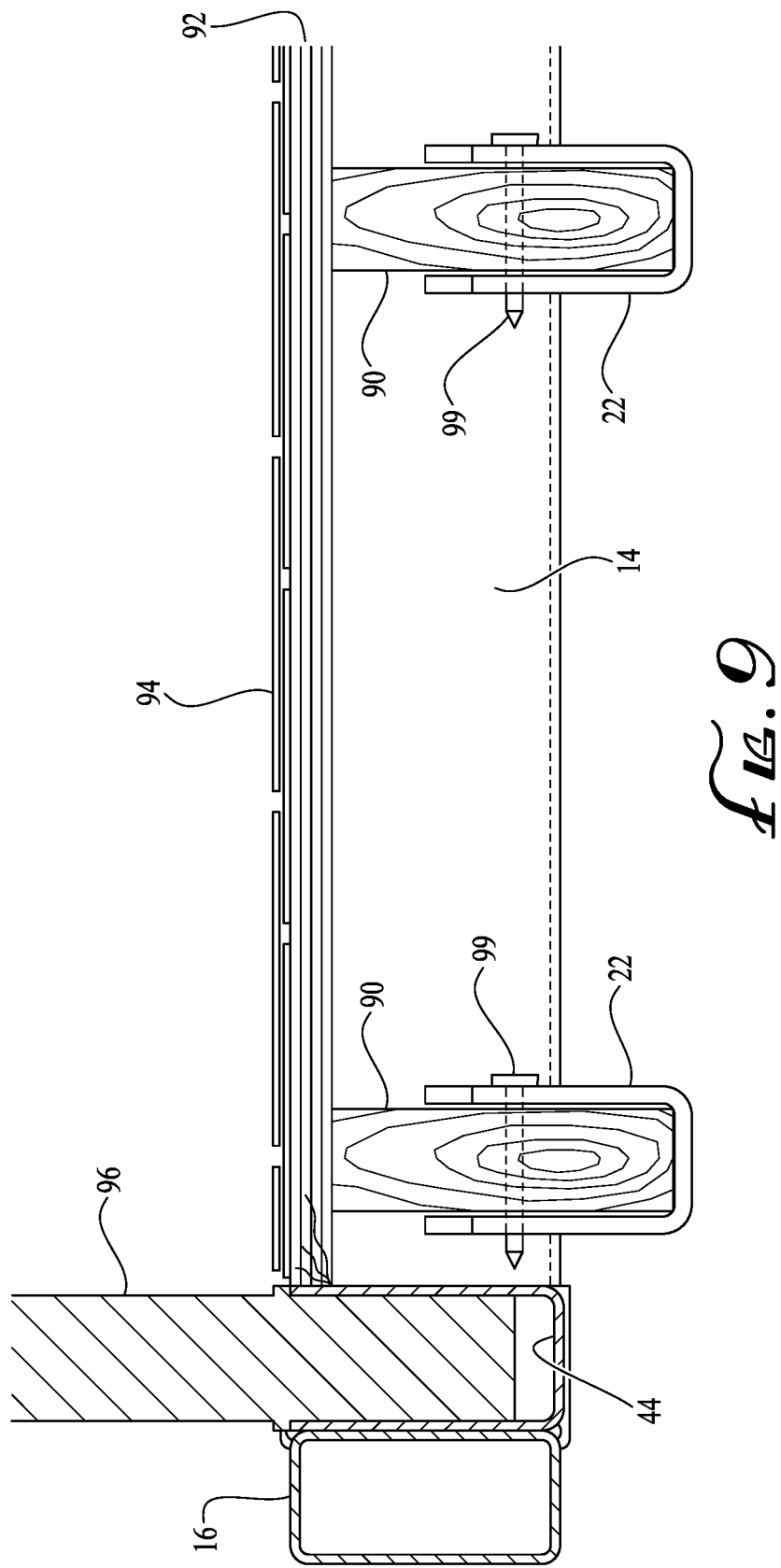

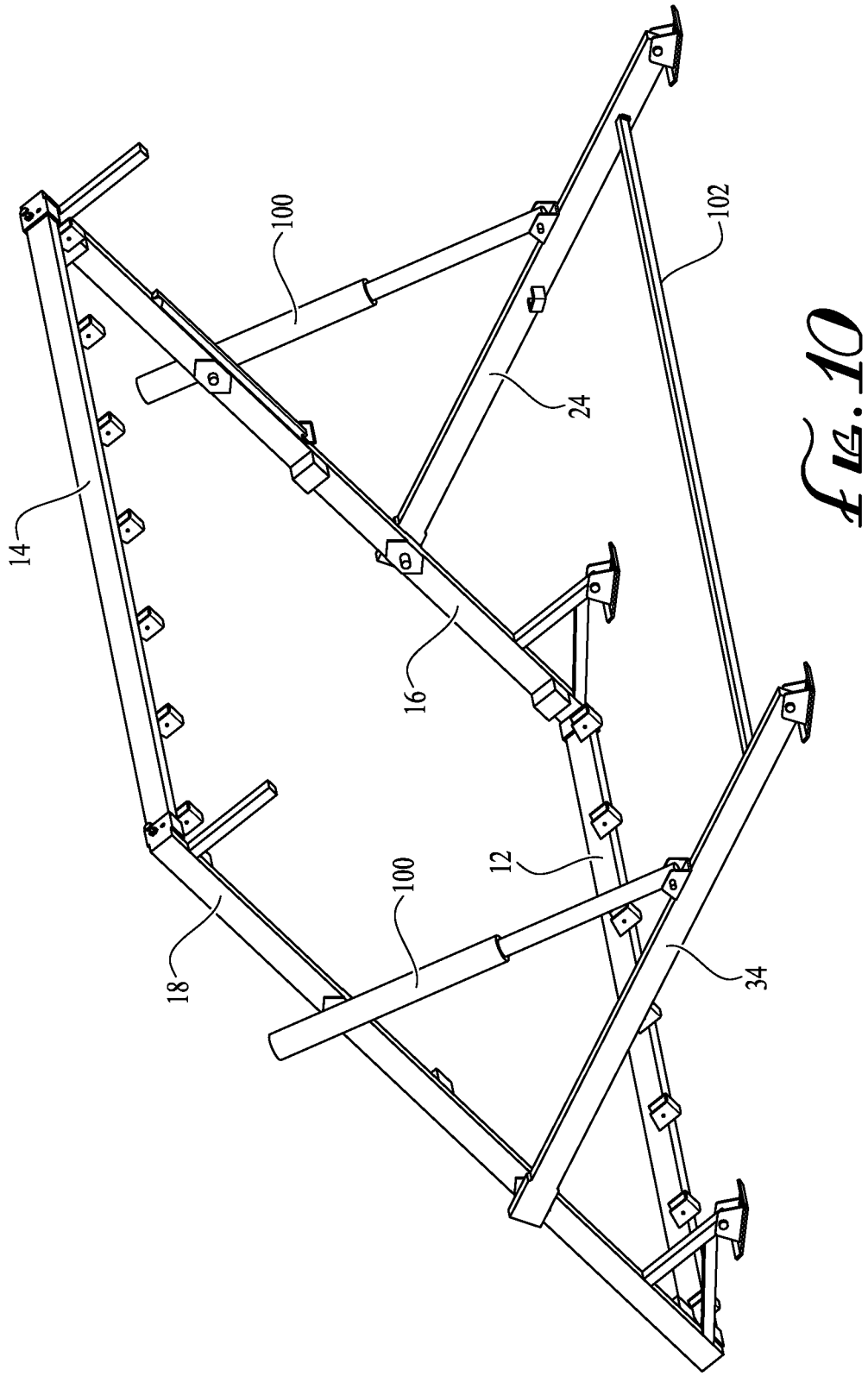

FREE-STANDING PORTABLE FIREFIGHTING TRAINING APPARATUS

The present invention relates broadly to firefighting training apparatus. Specifically, the present invention relates to firefighting training related to rooftop applications. More specifically, the present invention relates to a portable elevated platform upon which firefighters practice rooftop firefighting techniques.

BACKGROUND

Firefighters routinely place themselves in dangerous situations when fighting fires from rooftops of burning structures. Specialized tools and techniques have been developed to aid firefighters in these applications. While many fires present characteristics common to both vertical and horizontal ventilation, vertical ventilation often requires significant safety considerations, specialized tools, knowledge of roof openings, roof construction, roof coverings, and procedures for opening the roof.

While vertical ventilation doesn't in itself extinguish a fire, it provides effective containment of a fire's movement through a structure, and can reduce property damage. Removal of smoke allows more efficient rescue of victims who are overcome by smoke as visibility is improved once smoke is removed. One method of vertical ventilation by which smoke and heat may be removed from a structure is by opening the roof at its highest point, reducing the danger of a backdraft or a flashover and allowing water to be applied down into the structure onto the fire.

Vertical ventilation utilizes skills that must be practiced, such as maintaining safety of the firefighters, providing a second egress from the roof, having charged attack and protection lines ready, observing wind direction and intensity, noting dead loads and obstructions on a roof, constantly observing the roof and evaluating roofing materials and the condition of the roof, locating the seat of the fire, cutting large openings, and avoiding roof collapse when the roof is weakened by fire. Pitched roofs are the most difficult rooftops from which firefighters perform vertical ventilation. Pitched roofs are usually supported by wooden rafters, laminated beams, or wooden or steel trusses spanning the shortest distance between bearing walls. In the average home, the space between the roof and the ceiling defines an attic space, which may be vented by louvers under gable end of the roof.

Firefighters are trained carefully on vertical ventilation because of the inherent danger of operating at a distance above the ground. Training is performed on elevated structures, where firefighters practice operations such as hauling tools up ladders, operating tools including chain saws, rotary saws, stripping tools, pike poles, sledgehammers, rubbish hooks and pickhead axes safely on rooftops, cutting openings in a rooftop, lowering firefighters and/or equipment through the openings, and safely extracting people through the openings and evacuating people from rooftops. Typically, such training takes place on a stationary, permanently fixed training structure that is embodied in an elevated platform. Because of size, the construction of such structures is costly, and all training activities have to take place at the site of the structure.

Simulated environments for firefighter training are known in the art. U.S. Pat. No. 8,360,782 to Temple, assigned to the same assignee as the present invention, teaches a firefighter training apparatus that presents an elevated platform simulating rooftop mounted on a trailer and having a raising mechanism attached between the elevated platform and the trailer to raise and support the elevated platform at a desired pitch. The trailer provides the support structure for the apparatus.

U.S. Pat. No. 8,435,039 to Paganini, teaches a firefighter training apparatus in the form of an adjustable pitch simulated roof. The training apparatus may be mounted on a trailer or to a stationary vertical support such as a wall or other sturdy vertically oriented structure which is necessary to support the apparatus and is raised to a desired pitch using a lift cable.

FireVent LLC, the assignee of the present invention, offers a stationary roof simulating unit that has a variable pitch roof simulating platform that is pivotably attached to a separate stationary support frame. The frame is anchored to a foundation.

Other examples of a firefighting training apparatus simulating a roof is offered by King Training Innovations of Chicago, Illinois, employ vertical support members to raise one end of a simulated roof structure to a desired pitch.

There is thus a need for a firefighting training apparatus that is portable, free standing, compact, easily deployed, and having multiple training features for different firefighting operations such as vertical ventilation, forcible entry, confined space entry, extraction procedures, as well as rooftop safety and safe operation of tools in a rooftop application.

It is respectfully submitted that none of the above-indicated patents disclose, teach, suggest, show, or otherwise render obvious, either singly or when considered in combination, the portable simulated adjustable pitch roof described and claimed herein.

BRIEF DESCRIPTION

According to an aspect of the invention, a portable free-standing simulated roof firefighting training apparatus includes a rectangular frame having first and second sides defined by opposed first and second side members and first and second ends defined by bottom and top members attached to the first and second side members to form a roof area, first and second lifting arms having first ends pivotally mounted, respectively, to the first and second side members at an intermediate positions along their lengths, first and second vertical supports attached, respectively, to the first and second side members at positions proximate to the bottom member of the frame, a first raising mechanism pivotally mounted between the first side member of the frame and the first lifting arm, a second raising mechanism pivotally mounted between the second side member of the frame and the second lifting arm, and a first fixed vertical support attached to one of the first side member and the top member at a position proximate to a second end of the first side member and a second fixed vertical support attached to one of the second side member and the top member at a position proximate to a second end of the second side member.

According to an aspect of the invention, the free-standing portable simulated roof firefighting training apparatus further includes spaced apart rafter supports on inner faces of each of the first and second end members.

According to an aspect of the invention, the rafter supports include holes for securing rafters placed therein.

According to an aspect of the invention, the first and second raising mechanisms are screw jacks.

According to an aspect of the invention, the first and second raising mechanisms are hydraulic cylinders.

According to an aspect of the invention, the first and second side support arms each include multiple mounts for pivotally mounting first ends of the first and second screw jacks.

According to an aspect of the invention, the portable free-standing simulated roof firefighting training apparatus further includes a first transition support member movable from a stowed position to a deployed position in which it holds the first side of the frame at a fixed angle with respect to the first side support arm, and a second transition support member movable from a stowed position to a deployed position in which it holds the second side of the frame at a fixed angle with respect to the second side support arm.

According to an aspect of the invention, the first transition support member is pivotally movable from the stowed position to the deployed position in which it is held in a first support pocket, and the second transition support member is pivotally movable from the stowed position to the deployed position in which it is held in a second support pocket.

According to an aspect of the invention, the first transition support member is pivotally mounted to the first side of the frame and is rotatable from the stowed position to the deployed position in which it is held in the first support pocket mounted on the first side support arm, and the second transition support member is pivotally mounted to the second side of the frame and is rotatable from the stowed position to the deployed position in which it is held in the second support pocket mounted on the second side support arm.

According to an aspect of the invention, the portable free-standing simulated roof firefighting training apparatus further includes safety fence support sockets positioned along inner faces of the first and second side members.

According to an aspect of the invention, the portable free-standing simulated roof firefighting training apparatus further includes a lifting arm foot pivotally mounted to a second end of each of the first and second lifting arms.

According to an aspect of the invention, a portable free-standing simulated roof firefighting training apparatus includes a frame including opposed first and second side members attached to first and second end members to define a rectangular roof area, each of the first and second end members including spaced apart rafter supports opposing one another on inner faces thereof, a first side support arm having a first end pivotally mounted to the first side member at a raising pivot position inward from the first vertical support member and a second end pivotally mounted to a third foot, a second side support arm having a first end pivotally mounted to the second side member at a raising pivot position inward from the second vertical support member and a second end pivotally mounted to a fourth foot, a first raising mechanism having a first end pivotally mounted to the first side support arm between the raising pivot position and the second end of the first side support arm, a second raising mechanism having a first end pivotally mounted to the second side support arm between the raising pivot position and the second end of the second side support arm, a first vertical support member attached to the first side member at a position proximate to a first end thereof and pivotally mounted to a first foot, a second vertical support member attached to the second side member at a position proximate to a first end thereof and pivotally mounted to a second foot, a third vertical support member attached to one of the first side member and the second end member at a position proximate to a second end of the first side member, and a fourth vertical support member attached to one of the second side member and the second end member at a position proximate to a second end of the second side member.

BRIEF DESCRIPTION OF THE DRAWING FIGURES

The invention will be explained in more detail in the following with reference to embodiments and to the drawing in which are shown:

Figure 8:
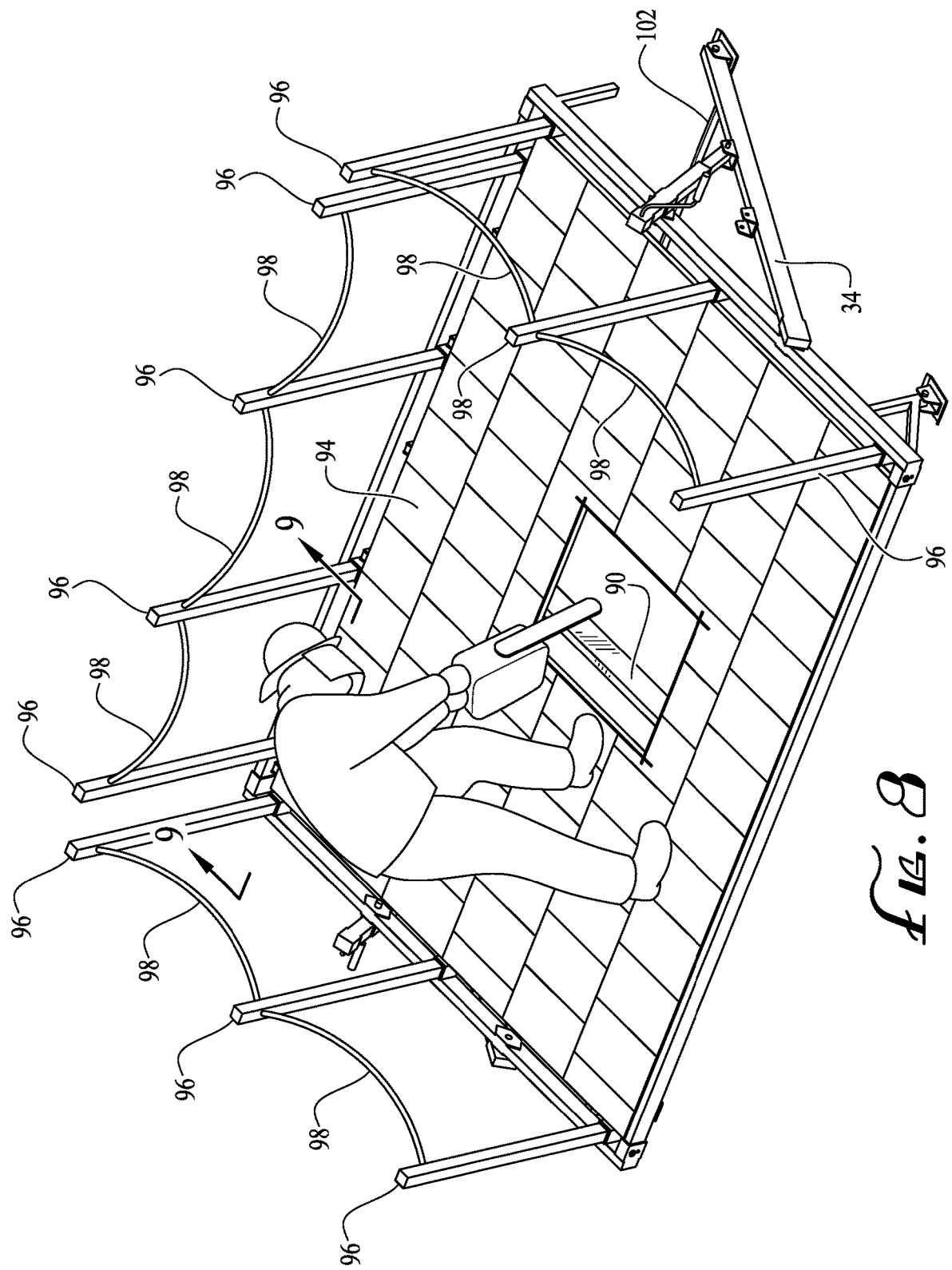
FIG. 8 is an isometric view illustrating the use of the instance of the firefighting training apparatus of the present invention depicted in FIGS. 1 and 7 and further depicting an optional chain post safety railing.

FIG. 9 is a partial section of the firefighting training apparatus of FIG. 8 taken along lines 9-9 to illustrate seating and fastening of rafters in rafter pockets disposed on the frame; and FIG. 10 is an isometric view of the frame and lifting portion of an illustrative instance of the firefighting training apparatus of the present invention in an extended position to a desired pitch using one of hydraulic or pneumatic cylinders.

DETAILED DESCRIPTION

Persons of ordinary skill in the art will realize that the following description is illustrative only and not in any way limiting. Other embodiments will readily suggest themselves to such skilled persons.

Figure 1:
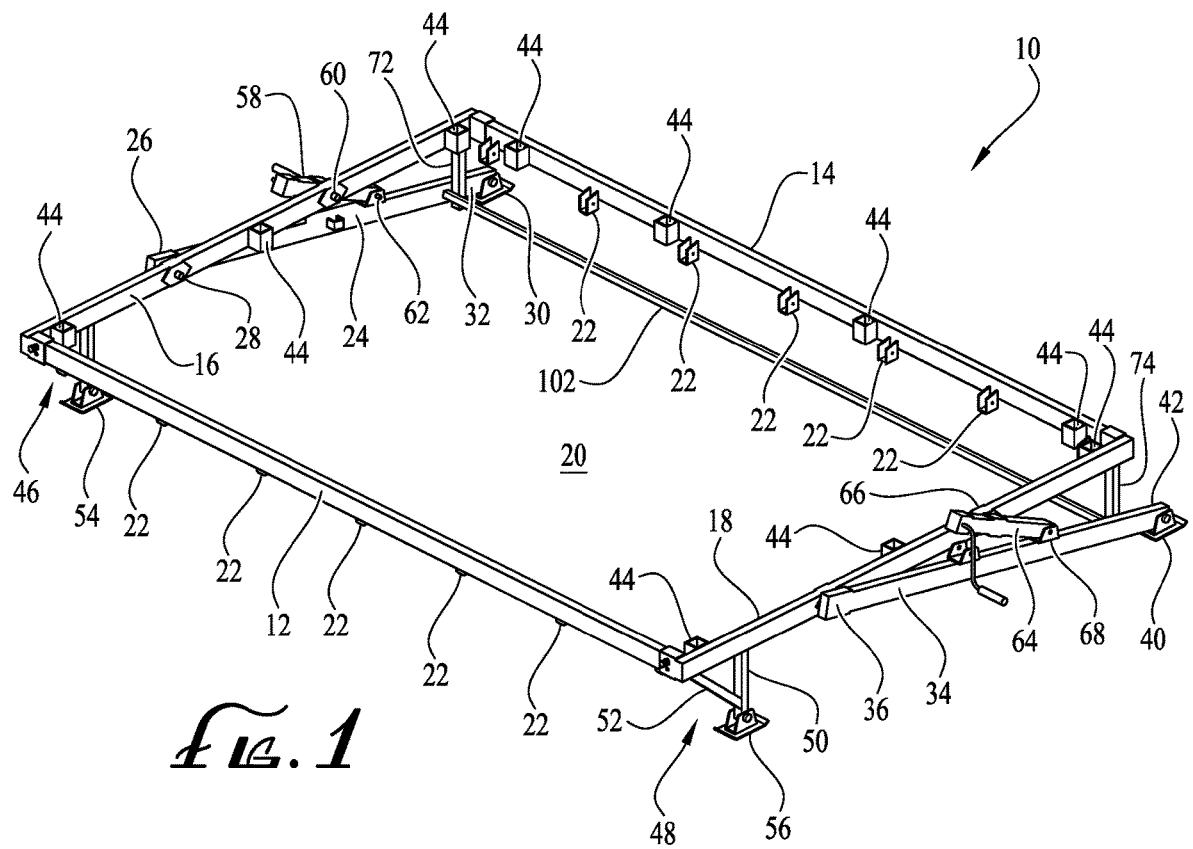
FIG. 1 is an isometric view of the frame and lifting portion of an illustrative instance of the firefighting training apparatus of the present invention in a lowered position.

Referring first to FIG. 1, an isometric view shows the frame and lifting portion of an illustrative instance of the firefighting training apparatus 10 of the present invention lowered position. The firefighting training apparatus 10 is free standing, which means that it can be simply placed on the ground and does not need to be held in place or in any way anchored, mounted or attached to any supports. The firefighting training apparatus 10 is formed from bottom frame member 12 and top frame member 14 top and bottom frame members 12 and 14, respectively, that are coupled to first side frame member 16 and second side member 18 using conventional fastening means such as bolts, rivets, or welds to form a roof area 20. The bottom frame member 12 and top frame member 14, and the first and second side frame members 16 and 18 are collectively referred to herein as the frame. Rafter supports 22 are attached to the inner faces of the bottom frame member 12 and top frame member 14. FIG. depicts u-shaped rafter supports 22 but persons of ordinary skill in the art will appreciate that other forms, including but not limited to l-shaped or flat faced rafter supports can be employed. A first lifting arm 24 having a first end 26 is pivotally mounted to the first side frame member 16 at a pivot point 28 located at an intermediate position along its length. In one instance of the invention, a lifting arm foot 30 is pivotally mounted to a second end 32 of the first lifting arm 24.

A first lifting arm 24 having a first end 26 is pivotally mounted to the first side frame member 16 at a pivot point 28 located at an intermediate position along its length. In one instance of the invention, a lifting arm foot 30 is pivotally mounted to a second end 32 of the first lifting arm 24.

A second lifting arm 34 having a first end 36 is pivotally mounted to the second side frame member 18 at a pivot point 38 (shown in FIG. 2) located at an intermediate position along its length. In one instance of the invention, a lifting arm foot 40 is pivotally mounted to a second end 42 of the second lifting arm 34.

A number of safety fence support sockets 44 are positioned along inner faces of the top frame member 14 and the first and second side frame members 16 and 18. As will be appreciated by persons of ordinary skill in the art, the number of safety fence support sockets 44 that are needed for the top frame member 14 and the first and second side frame members 16 and 18 will vary in accordance with the desired spacing between the fence supports being used and the lengths of the top frame member 14 and the first and second side frame members 16 and 18.

A first vertical support 46 is attached to the first side member at a position proximate to the bottom member 12 of the frame and a second vertical support 48 is attached to the second side member at a position proximate to the bottom member 12 of the frame. In the instance of the invention depicted in the various drawing figures herein, the first vertical support 46 and second vertical support 48 are formed from a vertical support member 50 and an angled support member 52 to supply stability when the frame is angled at a desired pitch. In one instance of the invention, a foot 54 is pivotally mounted to first vertical support 46 and a foot 56 is pivotally mounted to second vertical support 48.

A first raising mechanism 58 is pivotally mounted between the first lifting arm 24 at an upper pivot point 60 and the first side member 16 of the frame at a first pivot saddle 62. A second raising mechanism 64 is pivotally mounted between the second lifting arm 34 at an upper pivot point 66 and the second side member 18 of the frame at a second pivot saddle 68. In the instance of the invention shown in FIGS. 1-6, the raising mechanisms 58 and 64 are depicted as hand cranked screw jacks. Persons of ordinary skill in the art will appreciate that other forms of raising mechanisms, such as, but not limited to other types of jacks, hydraulic cylinders, pneumatic cylinders, etc., can be used.

A first fixed vertical support 72 is attached to one of the first side frame member 16 and the top frame member 14 at a position proximate to where they are joined and a second fixed vertical support 74 is attached to one of the second side member and the second end member at a position proximate to where they are joined.

Figure 2:
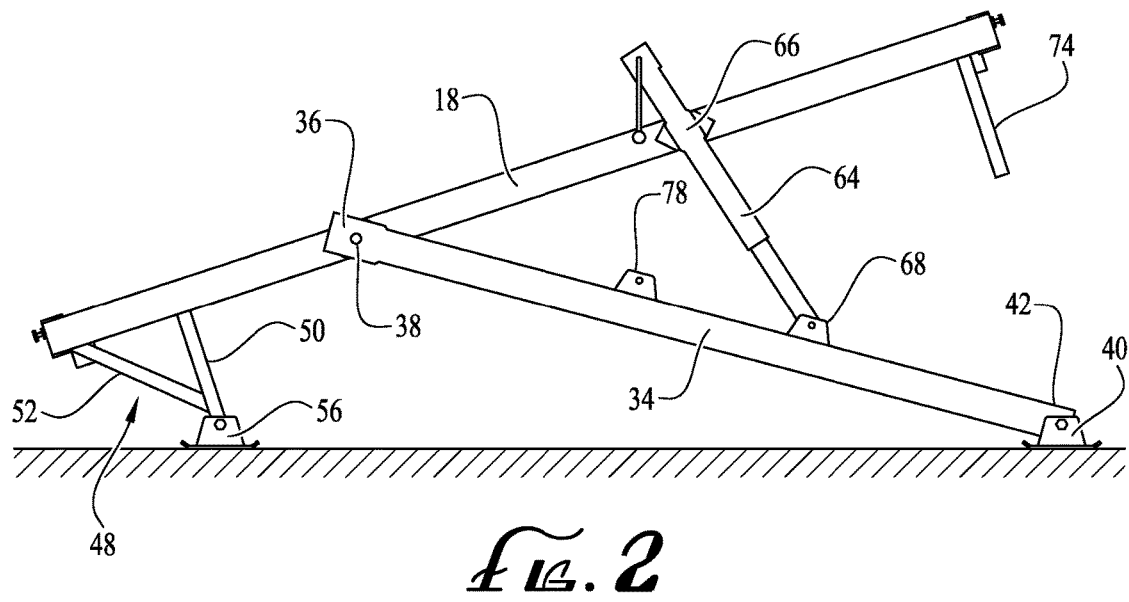
FIG. 2 is a side view of the instance of the firefighting training apparatus of the present invention depicted in FIG. 1 in a raised position for lower pitch angles.

Referring now to FIG. 2, a side view shows the instance of the firefighting training apparatus of the present invention depicted in FIG. 1 in a raised position for lower pitch angles where the first and second raising mechanisms are pivotally mounted to the side members of the frame at the first pivot saddles 62 and 68. In order to provide a larger range of pitch angles for a given pivot point (28, 38) in instances of the inventions where the raising mechanisms 58 and 64 extend by relatively short amounts, a second set of pivot saddles may be provided on the side frame members 16 and 18 at positions closer to their second ends. Such an arrangement is shown in FIGS. in FIGS. 1-6 and more closely in FIGS. 2-6. A second saddle 76 is provided on the side frame member 16 and a second saddle 78 is provided on the side frame member 18.

Figure 3:
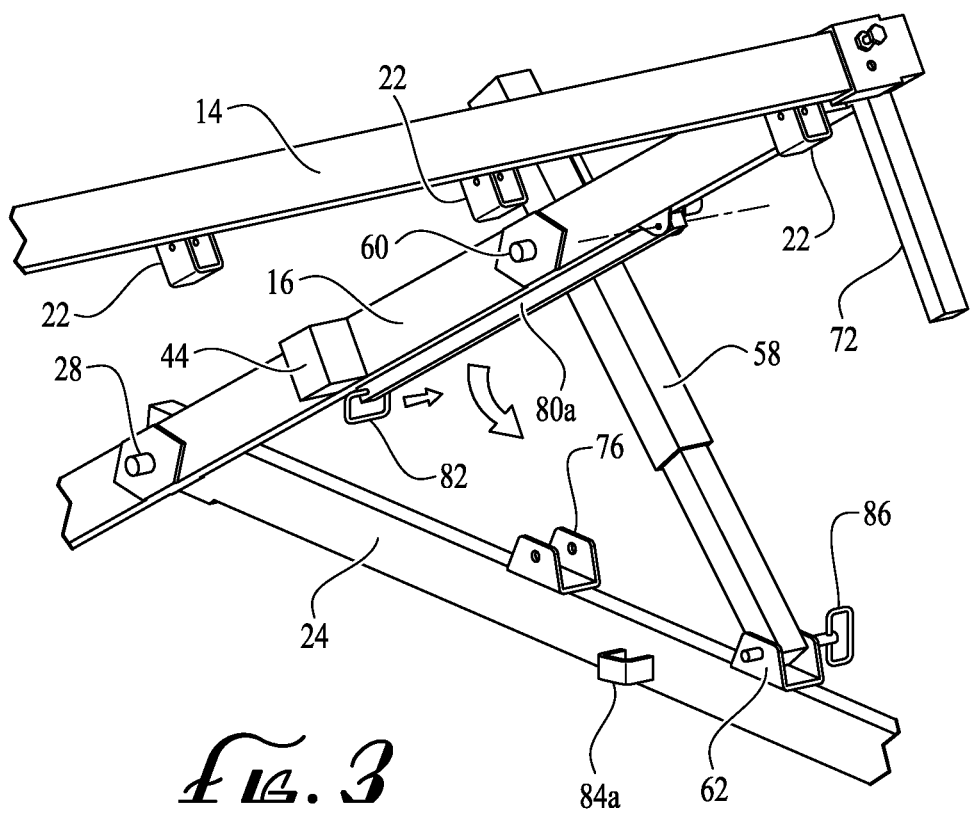
FIGS. 3 and 4 are isometric views of a portion of the instance of the firefighting training apparatus of the present invention depicted in FIGS. 1 and 2 in the raised position showing use of a temporary support to facilitate moving the jacks between a lower-pitch angle lifting position and a higher pitch angle lifting position.
Figure 4:
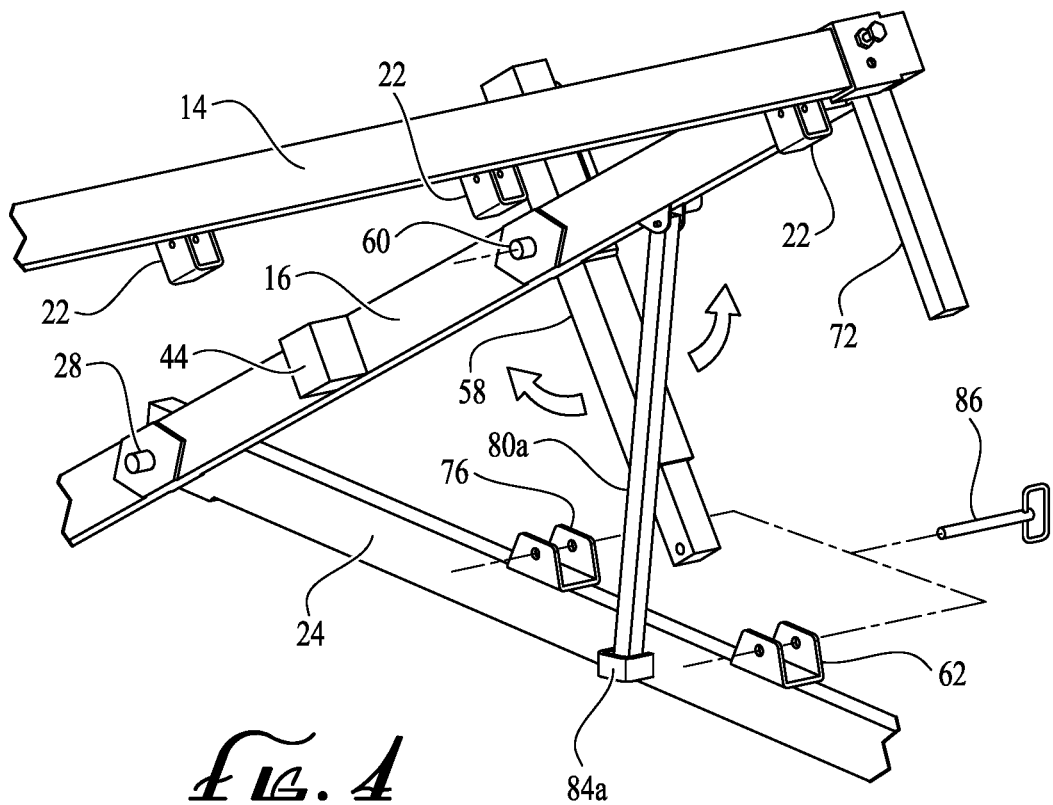

Referring now to FIGS. 3 and 4 in particular, partial isometric views of the firefighting training apparatus are depicted and show the operation of a support mechanism used to transition the lifting mechanism between the first set of pivot support saddles 62 and 68 and the second set of pivot support saddles 76 and 78 to facilitate moving the raising mechanisms 58 and 64 between a lower-pitch angle lifting position and a higher pitch angle lifting position. In the illustrative instance of the invention depicted in FIGS. 3 and 4, a first transition support member 80a is pivotally mounted to the underside of the first side member 16. FIG. 3 shows the first transition support member 80a rotated to a stowed position in which it may be held against the underside of the first side member 16 by, for example, a retaining pin such as bail pin 82 depicted in FIG. 3. FIG. 4 shows the first transition support member 80a in a deployed position nested in a first support pocket 84a disposed on the inner face of the first lifting arm 24 to hold the first side member at a fixed angle with respect to the first lifting arm 24.

Figure 5:
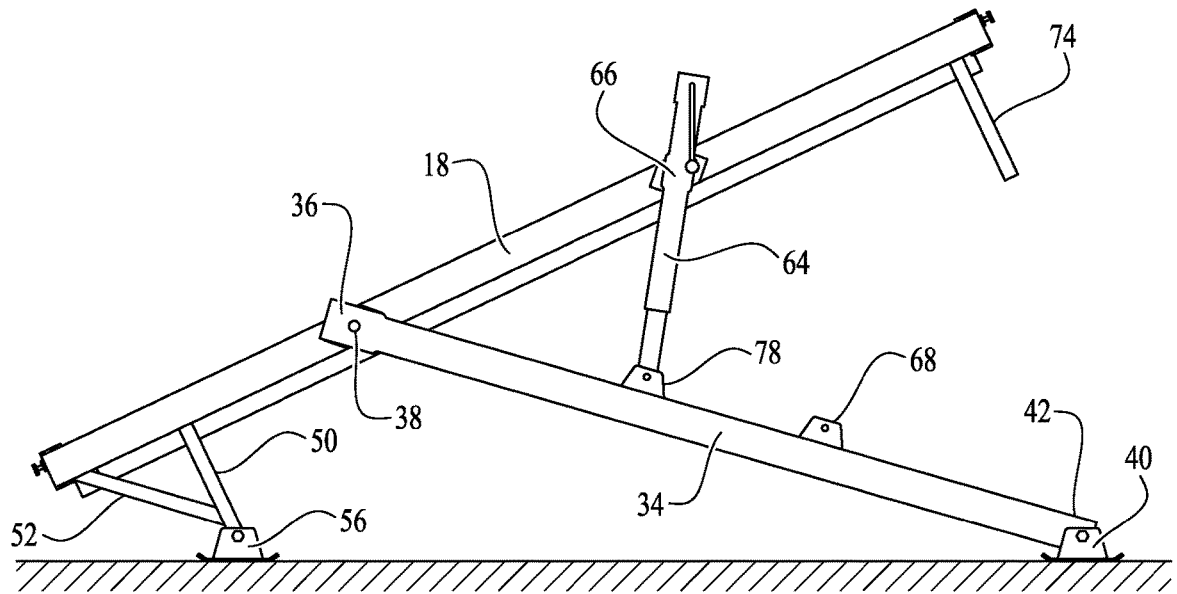
FIG. 5 is a side view of the instance of the firefighting training apparatus of the present invention depicted in FIG. 1 in a raised position for higher pitch angles.
Figure 6:
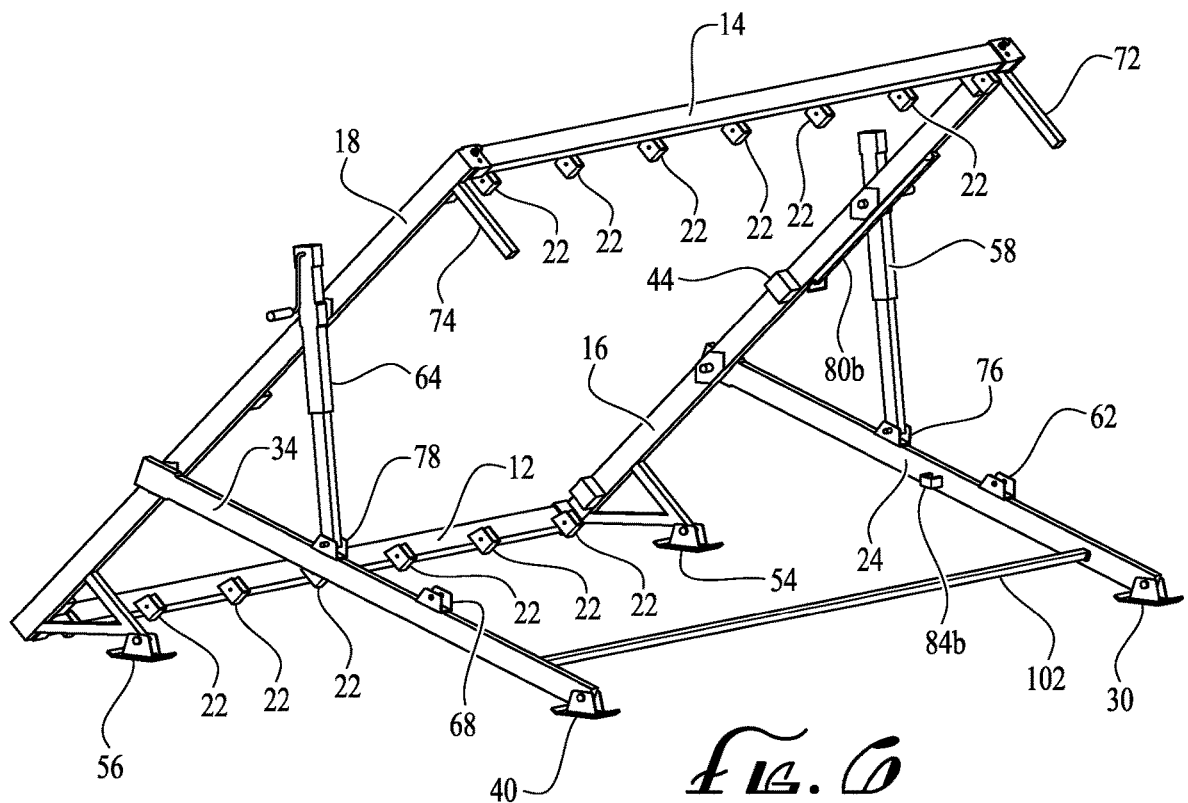
FIG. 6 is an isometric view of the instance of the firefighting training apparatus of the present invention depicted in FIG. 1 in a raised position for higher pitch angles.

Once the lifting mechanism 58 is extended to its fullest extent as shown in FIG. 3, the retaining pin 82 is removed and the first transition support member 80a is rotated to a position over the first support pocket 84a, the pivot pin 86 is removed from the pivot support saddle 62 and the lifting mechanism 60 is retracted until the first transition support member 80a is deployed and nested in the first support pocket 84a as shown in FIG. 4. The lifting mechanism 58 may then be further retracted and moved from the pivot support saddle 62 to the pivot support saddle 76 and the pivot pin inserted into pivot support saddle 76. The lifting mechanism 58 may then be further extended to the desired pitch angle and the first transition support member 80a is rotated back to its stowed position and held in place by the retaining pin 82. FIG. 5 shows the firefighting training apparatus after the lifting mechanism has been attached to pivot support saddle 76. FIG. 6 shows the firefighting training apparatus lifted to a higher pitch angle after the lifting mechanism has been attached to pivot support saddle 76. This aspect of the operation of firefighting training apparatus applies equally to the lifting mechanism 60 between saddles 68 and 78 and description of that operation will not be repeated to avoid redundancy. FIG. 6 also shows a second transition support member 80b and second support pocket 84b that are used to hold the second side member 18 at a fixed angle with respect to the second lifting arm 34 while transitioning the lifting mechanism 60 between saddles 68 and 78.

Persons of ordinary skill in the art will readily appreciate that the range of pitch angles provided by the instance of the present invention depicted in the drawing figures is simply a matter of design choice determined by the distance between the pivot point 60 and the pivot support saddles 62 and 76 respectively and may easily be calculated using elementary trigonometry. Such skilled persons will also appreciate that the positions of the first and second transition support members 80a, 80b and the first and second support pockets 84a, 84b may be reversed. In such a configuration the first and second transition support members 80a, 80b may be pivotally mounted to the inner faces of the first and second lifting arms 24, 34, respectively and the first and second support pockets 84a, 84b may be disposed on the undersides of the first and second side members 16, 18, respectively.

Figure 7:
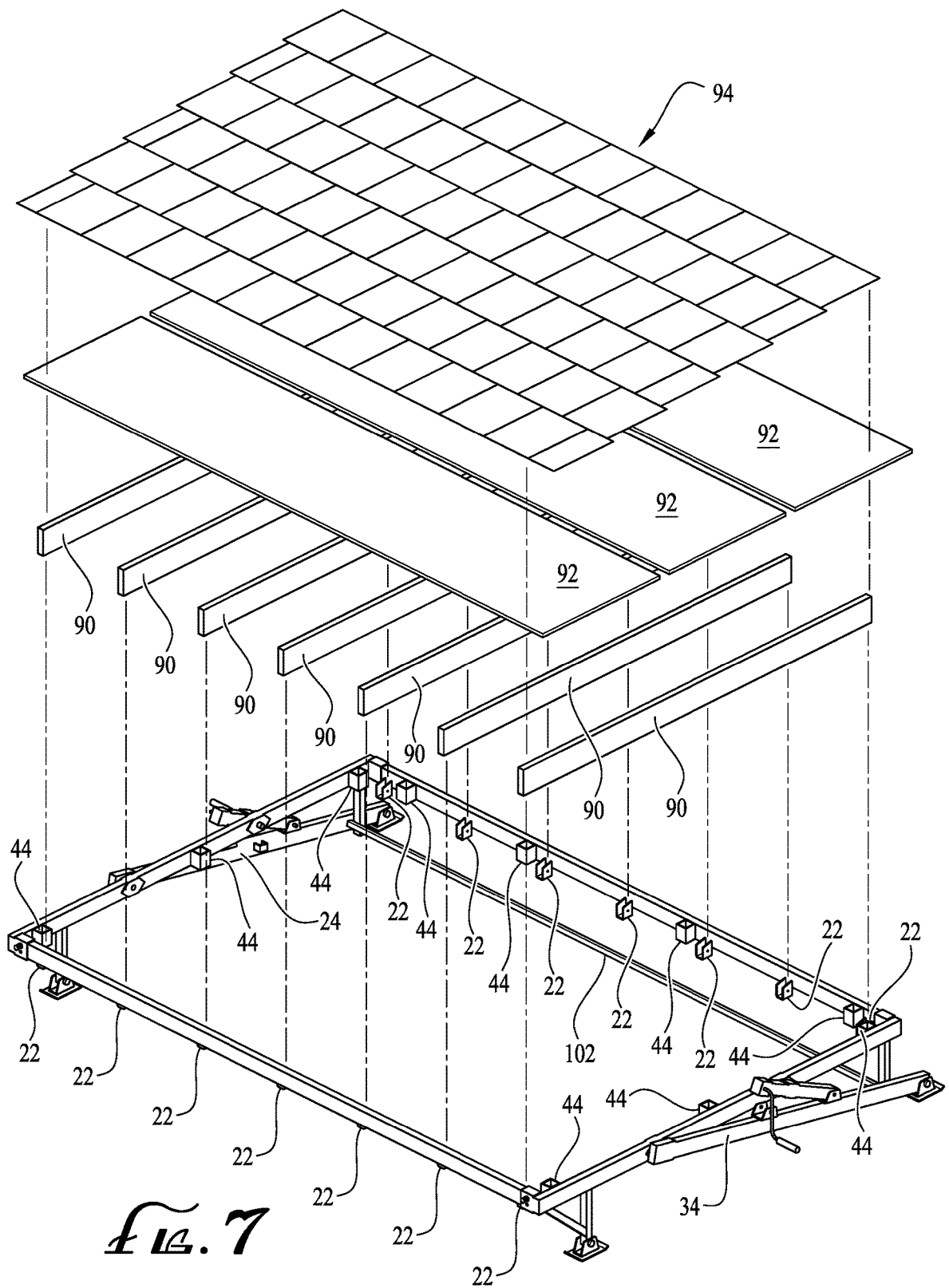
FIG. 7 is an exploded isometric view of the instance of the firefighting training apparatus of the present invention depicted in FIG. 1 showing a simulated roof structure including rafters, roof sheathing and shingles.

Referring now to FIG. 7, an exploded isometric view shows the instance of the firefighting training apparatus of the present invention depicted in FIG. 1 and depicts a simulated roof structure (platform) including rafters 90 with roof sheathing 92 and shingles 94 attached to simulate an example of a building roof that would be encountered by firefighters in a real fire situation.

In one instance of the invention shown in FIGS. 1, 6, 7, 8, and 10, a spacer member 102 may be attached between the lower ends of the first and second lifting arms 24 and 34 to space them apart from one another by the same amount distance as they are spaced apart where they are attached to the first and second side members 16 and 18 of the frame at the pivot points 28 and 38, respectively. The spacer member can help to prevent the free-standing firefighting training apparatus 10 from binding when the frame is being moved to a desired pitch or is being moved to its lowered position.

Referring now to FIG. 8, an isometric view illustrates a typical use of the instance of the firefighting training apparatus of the present invention depicted in FIGS. 1 and 7 and further depicting an optional chain post safety railing including upright safety railing posts 96 having lengths of rope, cable, or chain 98 strung between them.

Referring now to FIG. 9, a partial section of the firefighting training apparatus of FIG. 8 taken along lines 9-9 to illustrate seating and fastening of the rafters 90 in rafter pockets 22 disposed on the frame. While in some instances the combined weight of the rafters 90, the sheathing 92, and the shingles 94 would be sufficient to keep the structure in place within the frame, the rafter pockets 22 may be provided with fastening holes to accept nails or screws identified by reference numeral 99 to firmly hold the rafters 90 in place in the rafter pockets 22.

Referring now to FIG. 10, an isometric view shows the frame and lifting portion of an illustrative instance of the firefighting training apparatus 10 of the present invention in an extended position to a desired pitch using lifting mechanisms one of hydraulic or pneumatic cylinders identified using reference numerals 100. As with the use of jacks, persons of ordinary skill in the art will appreciate that only a single set of pivot support saddles would be required if the raising mechanisms 58 and 64 had a long enough travel between their fully retracted and fully extended positions.

If raising mechanisms 58 and 64 that are rated at 8,000 pounds are used a combined weight rating of 16,000 pounds is achieved. Unlike some prior-art units that use pins to hold the unit in position once it is raised to the desired pitch, the raising mechanisms 58 and 64 do not need a secondary device to hold the frame in the pitched position, Since the simulated roof firefighting training apparatus 10 of the present invention does not need to be pinned in the pitched position, an infinite number of pitch settings can be set between the fully retracted and fully extended positions of the jacks.

Another advantage of the present invention is that the lifting arms enable the unit to extend from a flat position to a 45° angled position by extending the raising mechanisms by a relatively small travel distance. By using two separate pivot support saddles for the raising mechanisms, an extended degree of lift on the platform is achievable. The simulated roof firefighting training apparatus of the present invention is also unique because, unlike the known prior art simulated roof firefighting training apparatus, there is no requirement to anchor it into the ground or into another solid structure or sub frame, and it does not require a vertical member "high point" for lifting or anchoring in the pitched or angled positions.

The simulated roof firefighting training apparatus of the present invention is quite versatile. For example, in addition to being deployable by simply placing it on the ground at a desired location, it can very easily be mounted on top of a structure such as a shipping container.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A portable free-standing simulated roof firefighting training apparatus comprising:
   a rectangular frame having first and second sides defined by opposed first and second side members and first and second ends defined by bottom and top members attached to the first and second side members to form a roof area;
   first and second lifting arms having first ends pivotally mounted, respectively, to the first and second side members;
   first and second vertical supports attached, respectively, to the first and second side members at positions proximate to the bottom member of the frame;
   a first raising mechanism pivotally mounted between the first side member of the frame and the first lifting arm;
   a second raising mechanism pivotally mounted between the second side member of the frame and the second lifting arm; and
   a first fixed vertical support rigidly attached to one of the first side member and the top member at a position proximate to where the first side member is attached to the top member and a second fixed vertical support rigidly attached to one of the second side member and the top member at a position proximate to where the second side member is attached to the top member.

2. The free-standing portable simulated roof firefighting training apparatus of claim 1 further including spaced apart rafter supports on inner faces of each of the bottom and top members.

3. The portable free-standing simulated roof firefighting training apparatus of claim 2 wherein the rafter supports include holes for securing rafters placed therein.

4. The portable simulated roof firefighting training apparatus of claim 1 wherein the first and second raising mechanisms comprise screw jacks.

5. The portable free-standing simulated roof firefighting training apparatus of claim 1 wherein the first and second raising mechanisms comprise hydraulic cylinders.

6. The portable free-standing simulated roof firefighting training apparatus of claim 4 wherein the first and second side lifting arms each include multiple mounts for pivotally mounting first ends of the first and second screw jacks.

7. The portable free-standing simulated roof firefighting training apparatus of claim 6 further including:
   a first transition support member movable from a stowed position to a deployed position in which it holds the first side of the frame at a fixed angle with respect to the first side lifting arm; and a second transition support member movable from a stowed position to a deployed position in which it holds the second side of the frame at a fixed angle with respect to the second side lifting arm.

8. The portable free-standing simulated roof firefighting training apparatus of claim 7, wherein:
the first transition support member is pivotally movable from the stowed position to the deployed position in which it is held in a first support pocket; and
the second transition support member is pivotally movable from the stowed position to the deployed position in which it is held in a second support pocket.

9. The portable free-standing simulated roof firefighting training apparatus of claim 8, wherein:
the first transition support member is pivotally mounted to the first side of the frame and is rotatable from the stowed position to the deployed position in which it is held in the first support pocket mounted on the first side lifting port arm; and
the second transition support member is pivotally mounted to the second side of the frame and is rotatable from the stowed position to the deployed position in which it is held in the second support pocket mounted on the second side lifting arm.

10. The portable free-standing simulated roof firefighting training apparatus of claim 1 further including safety fence support sockets positioned along inner faces of the first and second side members.

11. The portable free-standing simulated roof firefighting training apparatus of claim 1 further including a lifting arm foot pivotally mounted to a second end of each of the first and second lifting arms.

12. A portable free-standing simulated roof firefighting training apparatus comprising:
a frame including opposed first and second side members attached to first and second end members to define a rectangular roof area;
a first vertical support member attached to the first side member at a position proximate to a first end thereof and pivotally mounted to a first foot;
a second vertical support member attached to the second side member at a position proximate to a first end thereof and pivotally mounted to a second foot;
a third vertical support member rigidly attached to one of the first side member and the second end member at a position proximate to a second end of the first side member;
a fourth vertical support member rigidly attached to one of the second side member and the second end member at a position proximate to a second end of the second side member;
a first side support arm having a first end pivotally mounted to the first side member at a raising pivot position and a second end pivotally mounted to a third foot;
a second side support arm having a first end pivotally mounted to the second side member at a raising pivot position and a second end pivotally mounted to a fourth foot;
a first raising mechanism having a first end pivotally mounted to the first side support arm between the raising pivot position and the second end of the first side support arm; and
a second raising mechanism having a first end pivotally mounted to the second side support arm between the raising pivot position and the second end of the second side support arm.

13. The portable free-standing simulated roof firefighting training apparatus of claim 12 further including spaced apart rafter supports on inner faces of each of the first and second end members.

14. The portable free-standing simulated roof firefighting training apparatus of claim 12 wherein the rafter supports include holes for securing rafters placed therein.

15. The portable simulated roof firefighting training apparatus of claim 12 wherein the first and second raising mechanisms comprise screw jacks.

16. The portable free-standing simulated roof firefighting training apparatus of claim 12 wherein the first and second raising mechanisms comprise hydraulic cylinders.

17. The portable free-standing simulated roof firefighting training apparatus of claim 15 wherein the first and second side support arms each include multiple mounts for pivotally mounting first ends of the first and second screw jacks.

18. The portable free-standing simulated roof firefighting training apparatus of claim 17 further including:
a first transition support member movable from a stowed position to a deployed position in which it holds the first side of the frame at a fixed angle with respect to the first side support arm; and
a second transition support member movable from a stowed position to a deployed position in which it holds the second side of the frame at a fixed angle with respect to the second side support arm.

19. The portable free-standing simulated roof firefighting training apparatus of claim 18, wherein:
the first transition support member is pivotally movable from the stowed position to the deployed position in which it is held in a first support pocket; and
the second transition support member is pivotally movable from the stowed position to the deployed position in which it is held in a second support pocket.

20. The portable free-standing simulated roof firefighting training apparatus of claim 19, wherein:
the first transition support member is pivotally mounted to the first side member of the frame and is rotatable from the stowed position to the deployed position in which it is held in the first support pocket mounted on the first side support arm; and
the second transition support member is pivotally mounted to the second side member of the frame and is rotatable from the stowed position to the deployed position in which it is held in the second support pocket mounted on the second side support arm.

* * * * *